United States Patent
Aronen

(10) Patent No.: US 12,091,819 B2
(45) Date of Patent: Sep. 17, 2024

(54) ARRANGEMENT AND METHOD FOR ADJUSTING BLADE GAP IN REFINER

(71) Applicant: Valmet Technologies Oy, Espoo (FI)

(72) Inventor: Juha Aronen, Espoo (FI)

(73) Assignee: Valmet Technologies Oy, Espoo (FI)

( * ) Notice: Subject to any disclaimer, the term of this patent is extended or adjusted under 35 U.S.C. 154(b) by 571 days.

(21) Appl. No.: 17/115,303

(22) Filed: Dec. 8, 2020

(65) Prior Publication Data

US 2021/0180251 A1 Jun. 17, 2021

(30) Foreign Application Priority Data

Dec. 17, 2019 (FI) ...................................... 20196089

(51) Int. Cl.
| | |
|---|---|
| *D21D 1/00* | (2006.01) |
| *B02C 7/02* | (2006.01) |
| *B02C 7/14* | (2006.01) |
| *B02C 7/16* | (2006.01) |
| *D21D 1/24* | (2006.01) |
| *G01H 1/00* | (2006.01) |

(52) U.S. Cl.
CPC ............... *D21D 1/002* (2013.01); *B02C 7/02* (2013.01); *B02C 7/14* (2013.01); *B02C 7/16* (2013.01); *D21D 1/24* (2013.01); *G01H 1/00* (2013.01)

(58) Field of Classification Search
CPC .... B02C 7/02; B02C 7/14; B02C 7/16; D21D 1/002; D21D 1/24
USPC ......................................................... 241/28
See application file for complete search history.

(56) References Cited

U.S. PATENT DOCUMENTS

| | | | |
|---|---|---|---|
| 4,233,600 A | 11/1980 | Rogers et al. | |
| 4,627,578 A | 12/1986 | Whyte | |
| 6,314,381 B1 * | 11/2001 | Johansson | D21D 1/306 241/261.1 |
| 7,845,583 B2 * | 12/2010 | Svedberg | D21D 1/30 241/261.2 |

(Continued)

FOREIGN PATENT DOCUMENTS

| | | |
|---|---|---|
| EP | 1793033 B1 | 6/2007 |
| JP | 2003112069 B1 | 4/2003 |
| JP | 2008297638 B1 | 12/2008 |

OTHER PUBLICATIONS

Koskenhely, K. 2007. Effect of selected filling and pulp suspension variables in improving the performance of low-consistency refining.

(Continued)

*Primary Examiner* — Christopher L Templeton
*Assistant Examiner* — Fred C Hammers
(74) *Attorney, Agent, or Firm* — James Earl Lowe, Jr.

(57) ABSTRACT

An arrangement and a method for adjusting a blade gap in a refiner. The arrangement comprises at least one loading device arrangeable to move at least one refining element of the refiner in respect of at least one another refining element of the refiner for adjusting the blade gap between the refining elements, at least one vibration measuring device for measuring a vibration of the refiner in operation, and at least one control unit configurable to adjust the blade gap between the refining elements by controlling the at least one loading device to move the at least one refining element in respect of the at least one another refining element based on the measured vibration of the refiner.

2 Claims, 3 Drawing Sheets

(56) References Cited

U.S. PATENT DOCUMENTS

2002/0158628 A1    10/2002  Akerblom
2006/0231649 A1*   10/2006  Demler .................... D21D 1/30
                                                    241/21

OTHER PUBLICATIONS

Somboon, P. 2003. Evaluation of new refiner fillings, Thesis for Master of Science Degree.

* cited by examiner

US 12,091,819 B2

ARRANGEMENT AND METHOD FOR ADJUSTING BLADE GAP IN REFINER

FIELD OF THE INVENTION

The invention relates to a refiner. Especially the invention relates to adjusting of a size of a blade gap between substantially oppositely positioned refining elements in the refiner.

BACKGROUND OF THE INVENTION

A refiner, such as a refiner for refining lignocellulose-containing fibre material, comprises a number of oppositely positioned refining elements. Typically, the refiner for refining lignocellulose-containing fibre material comprises two oppositely positioned refining elements, one of them being a stationary refining element and the other one being a rotatable refining element arranged to be rotated relative to the stationary refining element. Between the opposing refining elements there is a free distance, i.e. a refining chamber or a blade gap, into which the lignocellulose-containing fibre material to be refined is supplied. In the blade gap the lignocellulose-containing fibre material is subjected to the refining effect determined by properties of refining surfaces of the refining elements and operational characteristics of the refiner, such as a rotational speed of the rotatable refining element and/or a pressure prevailing in the blade gap.

In typical refining of lignocellulose-containing fibre material the properties of the fibres are intended to be affected to without substantially affecting to a fibre length of the fibre material, i.e. without substantially affecting on the fibre length or cutting the fibres shorter. Therefore, in this kind of refining applications a blade gap adjustment has traditionally based on a power control of the main motor of the refiner. However, the power control of the main motor of the refiner is not an applicable way for refining applications wherein especially the fibre length is intended to be affected to, i.e. wherein the fibres is intended to be cut to have a shorter length, such as in manufacturing of microfibrillar cellulose (MFC) or nanofibrillar cellulose (NFC) wherein very accurate constant blade gap is essential.

BRIEF DESCRIPTION OF THE INVENTION

An object of the present invention is to provide a novel arrangement and method for adjusting a blade gap in a refiner.

The invention is based on the idea of measuring a vibration of the refiner in operation and adjusting the blade gap between refining elements of the refiner by moving at least one refining element in respect of at least one another refining element based on the measured vibration of the refiner.

An advantage of the invention is that the size of the blade gap may be adjusted very accurately with an arrangement comprising a very reasonable number of different devices.

BRIEF DESCRIPTION OF THE DRAWINGS

In the following the invention will be described in greater detail by means of preferred embodiments with reference to the accompanying drawings, in which.

For the sake of clarity, the figures show some embodiments of the invention in a simplified manner. Like reference numerals identify like elements in the figures.

DETAILED DESCRIPTION OF THE INVENTION

Figure 1:
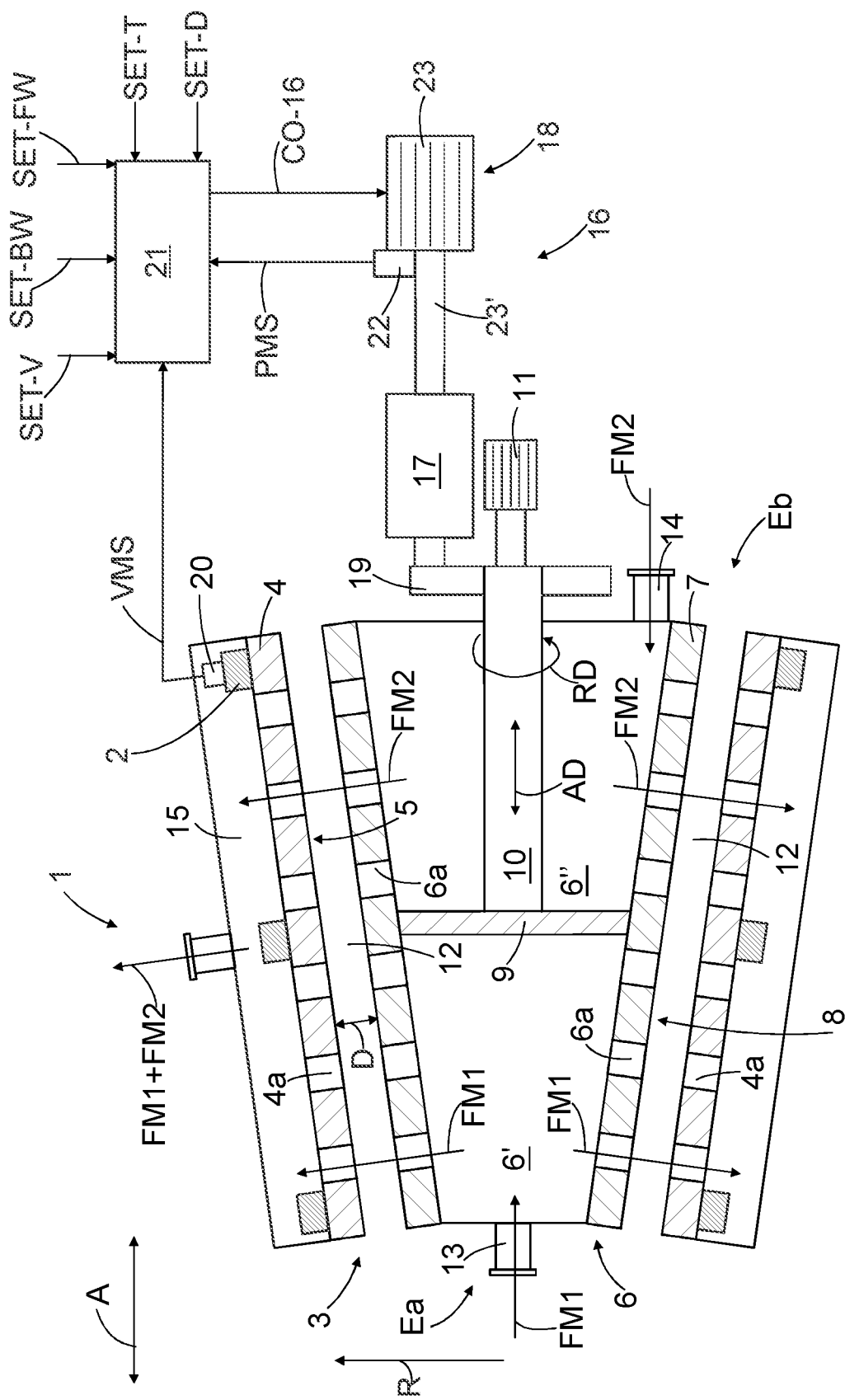
FIG. 1 shows schematically an arrangement for adjusting a blade gap in a refiner.

FIG. 1 is a very schematic side view of a conical refiner 1 partly in cross-section, which refiner 1 may be utilized to refine lignocellulose-containing wood-based fibre material. The refiner 1 has a first end Ea of smaller diameter and a second end Eb of larger diameter as seen in a radial direction R of the refiner.

The refiner 1 comprises a stationary refining element 3, i.e. a stator 3, having a first end facing towards the first end Ea of the refiner 1 and a second end facing towards the second end Eb of the refiner 1, and therefore, for the sake of clarity, the reference sign Ea is also used to denote the first end of the stator 3 and the reference sign Eb is also used to denote the second end of the stator 3. The stator 3 is supported to a frame structure 2 of the refiner 1, the frame structure 2 of the refiner 1 being shown highly simplified in FIG. 1.

The stator 3 comprises at least one stator blade element 4 having a refining surface, the stator blade element(s) 4 thus forming in the stator 3 the refining element(s) subjecting by the stator 3 the refining effect to the material to be refined. The stator 3 may thus comprise a single stator blade element providing a complete refining surface 5 of the stator 3. Typically, the stator 3 comprises two or more segment-like stator blade elements that together form the complete refining surface 5 of the stator 3. Typically, the refining surface of each stator blade element 4, and therefore the refining surface 5 of the stator 3, comprises blade bars and blade grooves therebetween, in a manner known by a person skilled in the art. The blade bars and the blade grooves of the refining surface 5 of the stator 3 are not shown in FIG. 1 for the sake of clarity. In the embodiment of FIG. 1 the stator blade element 4 further comprises openings 4a extending through the stator blade element 4.

The refiner 1 further comprises a rotatable refining element 6, i.e. a rotor 6, having a first end facing towards the first end Ea of the refiner 1 and a second end facing towards the second end Eb of the refiner 1, and therefore, for the sake of clarity, the reference sign Ea is also used to denote the first end of the rotor 6 and the reference sign Eb is also used to denote the second end of the rotor 6.

The rotor 6 comprises at least one rotor blade element 7 having a refining surface, the rotor blade element(s) 7 thus providing in the rotor 6 the refining element(s) subjecting by the rotor 6 the refining effect to the material to be refined. The rotor 6 may thus comprise a single rotor blade element providing a complete refining surface 8 of the rotor 6. Typically, the rotor 6 comprises two or more segment-like rotor blade elements that together form the complete refining surface 8 of the rotor 6. Typically, the refining surface of each rotor blade element 7, and therefore the refining surface 8 of the rotor 6, comprises blade bars and blade grooves therebetween, in a manner known by a person skilled in the art. The blade bars and the blade grooves in the refining surface 8 of the rotor 6 therebetween are not shown in FIG. 1 for the sake of clarity. In the embodiment of FIG. 1 the rotor blade element 7 further comprises openings 6a extending through the rotor blade element 7.

The rotor 3 comprises a hub 9 that forms at least part of a rotor frame against which the at least one rotor blade element 7 is supported to. The hub 9 is shown in FIG. 1 highly simplified. The hub 9 of the rotor 6 is connected to a shaft 10, the direction of extension of the shaft 10 forming an axial direction of the refiner 1 and is indicated schematically by an arrow A in FIG. 1. The shaft 10 is connected to a main motor 11 of the refiner 1. The main motor 11 is arranged to rotate the shaft 10 and, by the shaft 10, the rotor 6 for example in a rotation direction indicated with an arrow RD in FIG. 1. The size of the main motor 11 in view of the other parts of the refiner 1 is highly minimized in FIG. 1.

The stator 3 and the rotor 6 are positioned substantially oppositely relative to each other such that there is a refining chamber 12, i.e. a blade gap 12', between the stator 3 and the rotor 6. The refining chamber 12 or the blade gap 12 forms the volume wherein the fibre material is refined. The size of the blade gap 12 relative to the other components of the refiner 1 is exaggerated in FIG. 1. A free distance D between the opposing stator 3 and the rotor 6 indicates the size of the blade gap 12. The refining effect subjected to the fibre material to be refined in the blade gap 12 may be adjusted by adjusting the distance D between the stator 3 and the rotor 6, i.e. by adjusting the size of the refining chamber 12 or the blade gap 12.

The refiner 1 further comprises at the first end Ea of the refiner 1 a first feed channel 13 through which a first fibre material fraction denoted schematically with an arrow FM1 is fed into a first feed chamber 6' provided by an inner volume of the rotor 6 on the side of the first end Ea of the rotor 6. The refiner 1 further comprises at the second end Eb of the refiner 1 a second feed channel 14 through which a second fibre material fraction denoted schematically with an arrow FM2 is fed into a second feed chamber 6" provided by an inner volume of the rotor 6 on the side of the second end Eb of the rotor 6. The first FM1 and second FM2 fibre material fractions may be of same or different quality.

The operation of the refiner 1 of FIG. 1 is as follows.

The first fibre material fraction FM1 is supplied through the first feed channel 13 to the first feed chamber 6' and further, through the openings 6a at the first feed chamber 6' into the blade gap 12, wherein the first fibre material fraction FM1 is refined when the rotor 6 is rotated. The second fibre material fraction FM2 is supplied through the second feed channel 15 to the second feed chamber 6" and further, through the openings 6a at the second feed chamber 6" into the blade gap 12, wherein the second fibre material fraction FM2 is refined. The openings 6a thus connect the first feed chamber 6' and the second feed chamber 6" to the blade gap 12. The first FM1 and the second FM2 fibre material fractions are thus subjected in the blade gap 12 to the refining effect provided by the refining surfaces 5, 8 of the stator 3 and the rotor 6 when the rotor 6 is rotated. The first FM1 and the second FM2 fibre material fractions refined in the blade gap 12 are discharged out of the blade gap 12, through the openings 4a in the stator blade element 4, into a discharge chamber 15 at a background of the stator blade element 4. The openings 4a thus connect the blade gap 12 to the discharge chamber 15. The flow of the first FM1 and the second FM2 fibre material fractions into the blade gap 12 and out of the blade gap 12 are denoted schematically also with respective arrows FM1 and FM2. From the discharge chamber 15 the refined first FM1 and second FM2 fibre material fractions are discharged out of the refiner 1 through a discharge channel 16 to a further processing, as shown schematically with an arrow denoted with reference sign FM1+FM2. The refining effect subjected to the fibre material fractions FM1 and FM2 may be adjusted by adjusting the distance D between the stator 3 and the rotor 6, i.e. by adjusting the size of the refining chamber 12 or the blade gap 12.

FIG. 1 shows schematically a loading device 16 which may be coupled to the shaft 10 of the refiner 1 for moving the rotor 6 in the axial direction A back and forth, as indicated schematically with an arrow AD, in order to adjust the distance D between the stator 3 and the rotor 6, i.e. in order to adjust the size of the refining chamber 12 or the blade gap 12.

The loading device 16 of FIG. 1 comprises an actuating device 17 coupled to the shaft 10 of the rotor 6, either directly, or indirectly through a coupling element 19, as shown in FIG. 1. The actuating device 17 is arranged to move, in response to the operation of the actuating device 17, the rotor 6 either towards the first end Ea of the refiner 1 for reducing the distance D between the stator 3 and the rotor 6, i.e. for reducing the size of the blade gap 12, or towards the second end Eb of the refiner 1 for increasing the distance D between the stator 3 and the rotor 6, i.e. for increasing the size of the blade gap 12. The actuating device 17 may for example be an actuating cylinder, such as a ball screw actuator or a planetary screw actuator. Instead of the shaft 10 of the rotor 6, the actuating device 17, and thereby the loading device 16, may be arranged in connection with the rotor 10 by some other means.

The loading device 16 of FIG. 1 further comprises an adjusting device 18 arranged in connection with the actuating device 17 or coupled to the actuating device 17 for controlling the operation of the actuating device 17 for controlling the movement of the rotor 6. The adjusting device 18 is arranged to cause the operation of the actuating cylinder 17 to move the rotor 6 either towards the first end Ea of the refiner 1 for reducing the distance D between the stator 3 and the rotor 6 or towards the second end Eb of the refiner 1 for increasing the distance D between the stator 3 and the rotor 6.

Traditionally the blade gap adjustment has based on a power control of the main motor 11 of the refiner 1, the reason for that being that in typical refining only the properties of the fibres in the lignocellulose-containing fibre material are intended to be affected to without substantially affecting on the fibre length or cutting the fibres shorter. However, the power control of the main motor 11 of the refiner 1 is not an applicable way for refining applications wherein, either alternatively or additionally, the fibre length is intended to be affected to by cutting the fibres to have shorter length and an accurate constant blade gap is desirable. Examples of this kind of refining applications are for example manufacturing of microfibrillar cellulose (MFC) or nanofibrillar cellulose (NFC).

An arrangement for adjusting a blade gap in a refiner comprises, according to the solution disclosed herein, at least one loading device arrangeable to move at least one refining element of the refiner in respect of at least one another refining element of the refiner for adjusting the blade gap between the refining elements, at least one vibration measuring device for measuring a vibration of the refiner in operation, in other words during the refiner run, and at least one control unit configurable to adjust the blade gap between the refining elements by controlling the at least one loading device to move the at least one refining element in respect of the at least one another refining element based on the measured vibration of the refiner.

Referring to the embodiment of FIG. 1, the arrangement for adjusting the blade gap 12 in the refiner 1 comprises the loading device 16 coupled to the rotor 6 for moving the rotor 6 in respect of the stator 3, the loading device 16 being able to move the rotor 6 in the axial direction A back and forth, as indicated schematically with the arrow AD.

The arrangement of FIG. 1 further comprises a vibration measuring device 20 for measuring a vibration of the refiner 1 in operation. The vibration measuring device 20, which may for example be a vibration measuring sensor, such as an acceleration sensor, is preferably arranged at a non-movable part of the refiner 1, such as a frame structure 2 of the refiner 1, as shown in FIG. 1. According to an embodiment the vibration measuring device 20 is arranged at a fastening point of a stator blade element at a casing at a feed end of the refiner 1, which provides a robust location for the vibration measuring device 20.

The arrangement of FIG. 1 further comprises a control unit 21 configurable to adjust the blade gap 12 between the oppositely positioned refining elements 3, 6 by controlling the loading device 12 to move the rotor 6 in respect of the stator 3 based on the measured vibration of the refiner 1. The control signal from the control unit 21 to the loading device 16, and especially to the adjusting device 18 of the loading device 16, is depicted schematically with an arrow CO-16.

According to an embodiment of the arrangement, the at least one control unit is configurable to control the at least one loading device to move the at least one refining element towards the at least one another refining element, to receive from the vibration measuring device a vibration measurement signal describing the measured vibration of the refiner, to compare the received vibration measurement signal to a condition settable for the vibration of the refiner, and to control the at least one loading device to move the at least one refining element away from the at least one another refining element in accordance with a settable distance in response to the vibration measurement signal fulfilling the condition settable for the vibration of the refiner.

According to this embodiment, and referring to the embodiment of FIG. 1, the control unit 21 is configured to control the loading device 16 to move the rotor 6 towards the stator 3. Simultaneously the control unit 21 receives from the vibration measuring device 20 a vibration measurement signal VMS representing the vibration of the refiner 1 in operation. The control unit 21 comprises a vibration monitoring unit and possible amplifier unit for the vibration measurement signal VMS. The control unit 21 is configured to compare the measured vibration measurement signal VMS to a settable condition SET-V set for the vibration of the refiner 1, the condition SET-V intended to provide a reference limit value set for the vibration of the refiner 1. The condition or the reference limit value SET-V set for the vibration of the refiner 1 may refer to a specific characteristic of the vibration measurement signal VMS, such as an amplitude or a frequency of the vibration measurement signal VMS. The characteristic of the vibration measurement signal VMS depends at least on the distance between the stator 3 and the rotor 6, and when the refiner 1 is in operation and the rotor 6 approaches the stator 3, at least the amplitude of the vibration measurement signal VMS tends to increase.

The control unit 21 is configured to control the loading device 16 to move the rotor 6 towards the stator 3 as long as the vibration measurement signal VMS reaches the condition SET-V set for the characteristic of the vibration measurement signal VMS. In response to the vibration measurement signal VMS fulfilling the condition SET-V set for the vibration of the refiner 1, the control unit 16 is configured to control the loading device 16 to move the rotor 6 away from the stator 3 a distance that corresponds to a settable distance SET-BW set for the distance how much the rotor 6 is to be moved away from the stator 3 such that a desired blade gap size SET-D or a set value SET-D for the size of the blade gap 12 is achieved. Because a specific control signal CO-16 set for controlling the operation of the loading device 16 provides, due to a known mechanical coupling between the loading device 16 and the rotor 6, a specific movement of the rotor 6 in the axial direction A of the refiner 1, the size of the blade gap 12, i.e. the distance D, between the stator 3 and the rotor 6 may be adjusted accurately.

According to an embodiment of the arrangement, the at least one control unit is configurable to control the at least one loading device to move the at least one refining element towards the at least one another refining element until the refining elements touch to each other.

According to this embodiment, and referring to the embodiment of FIG. 1, the control unit 21 is configured to control the loading device 16 to move the rotor 6 towards the stator 3 until the stator 3 and the rotor 6 touch to each other. When the refining surface 8 of the rotor 6 touches the refining surface 5 of the stator 3, the size of the blade gap 12, i.e. the distance D between the refining surface 8 of the rotor 6 and the refining surface 5 of the stator 3, is zero, what can be detected by the control unit 21 from the vibration measurement signal VMS on the basis of the condition SET-V set for the vibration measurement signal VMS. In response to the vibration measurement signal VMS indicating that the refining surface 8 of the rotor 6 and the refining surface 5 of the stator 3 touch to each other, the control unit 21 is configured to control the loading device 16 to move the rotor 6 away from the stator 3 according to the predetermined distance SET-BW set in the control unit 21.

Figure 2:
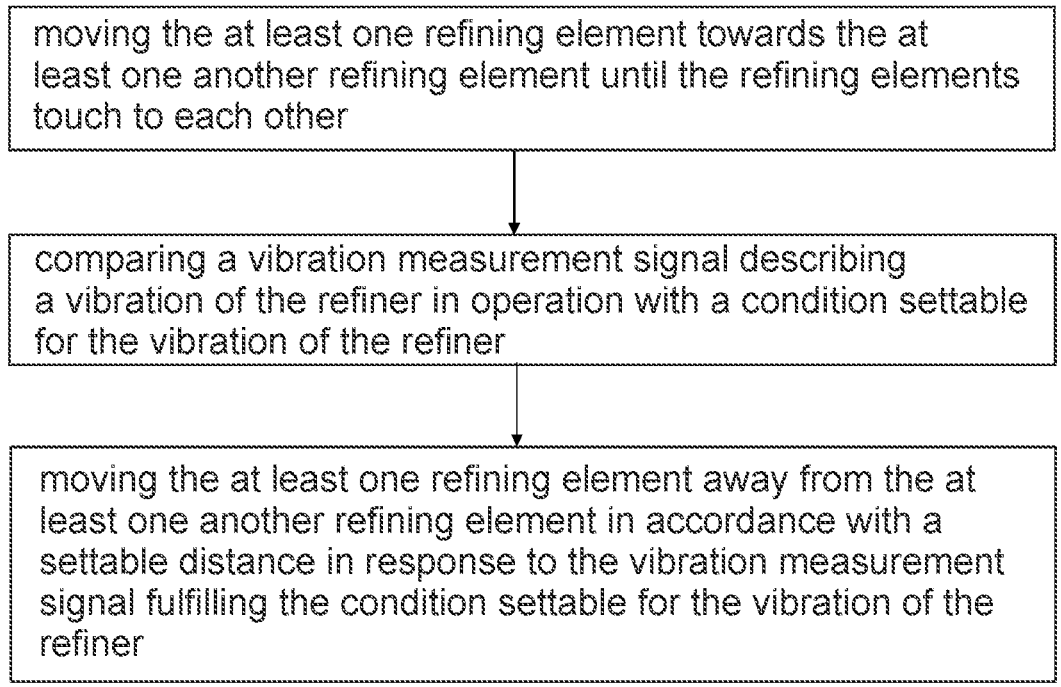
FIG. 2 shows schematically a method for adjusting a blade gap in the refiner.

Herein the settable predetermined distance SET-BW may correspond to the set value SET-D for the size of the blade gap 12, and the control unit 21 is configured to move the rotor 6 away from the stator 3, after the stator 3 and the rotor 3 have touched to each other and taking into account the mechanical coupling between the loading device 16 and the rotor 6, such that the size of the blade gap 12, i.e. the distance D between the refining surface 5 of the stator 3 and the refining surface 8 of the rotor 6, corresponds to the set value SET-D set for the distance D between the refining surface 5 of the stator 3 and the refining surface 8 of the rotor 6. By moving the rotor 6 towards the stator 3 as long as they touch each other, and thereafter by moving the rotor 6 away from stator 3 a distance corresponding to the set value SET-D set for the distance D between the refining surface 5 of the stator 3 and the refining surface 8 of the rotor 6, the size of the blade gap 12 may be adjusted very accurately. The embodiment of the method like that is disclosed schematically in FIG. 2.

The set value SET-D for the size of the blade gap 12 may vary depending on the actual refining application. Typically, the set value SET-D may be between 0,0005-0,2 mm. In manufacturing of microfibrillar cellulose (MFC) or nanofibrillar cellulose (NFC) the size of the blade gap 12 may for example be 0,001-0,02 mm.

According to an embodiment of the arrangement, the at least one control unit is configurable to control the at least one loading device to move the at least one refining element towards the at least one another refining element periodically after the at least one refining element has been moved away from the at least one another refining element in response to the vibration measurement signal having fulfilled the condition settable for the vibration of the refiner.

According to this embodiment, and referring to the embodiment of FIG. 1, the control unit 21 is configured to control the loading device 16 to move the rotor 6 back towards the stator 3 after the rotor 6 has been earlier moved away from the stator 3 in response to the vibration measurement signal VMS having fulfilled the condition SET-V set for the vibration of the refiner 1. The intention of the movement of the rotor 6 back towards the stator 3 is to keep the size of the blade gap 12 substantially at its set value SET-D in response to wear of the refining surfaces 5, 8 of the stator 3 and the rotor 6.

According to an embodiment of the arrangement, the control unit is configurable to control the at least one loading device to move the at least one refining element towards the at least one another refining element periodically in accordance with a settable distance at a settable time interval.

Figure 3:
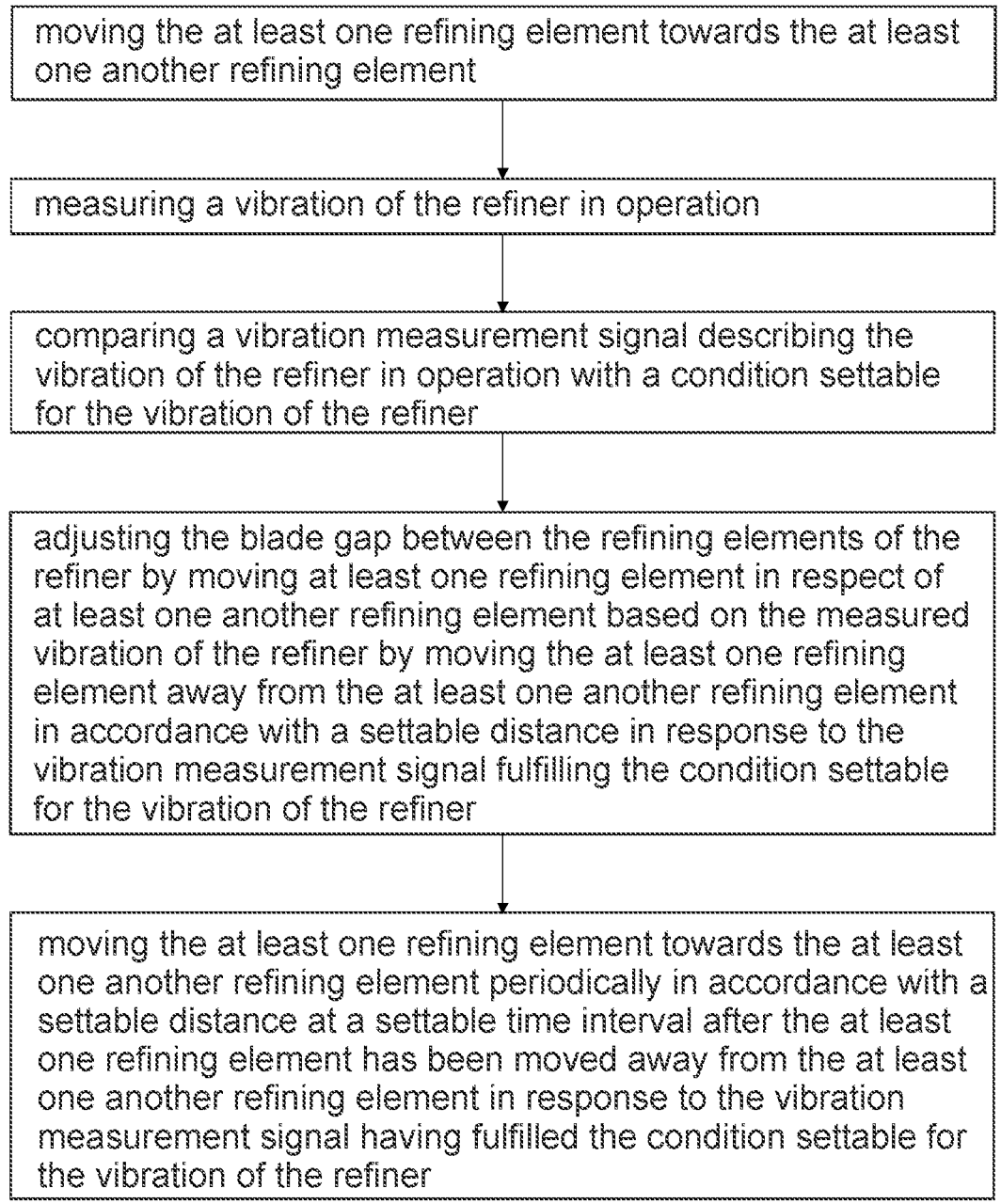
FIG. 3 shows schematically another method for adjusting a blade gap in the refiner.

According to this embodiment, and referring to the embodiment of FIG. 1, the control unit 21 is arranged to control the loading device 16 to move the rotor 6 towards the stator 3 intermittently, according to a set value SET-T set for the time interval after which the control unit 21 is arranged to control the loading device 16 to move the rotor 6 towards the stator 3. A set value SET-FW is configured to determine the distance how much the rotor 6 is to be moved towards the stator 3 at a time. The set value SET-FW refers to an amount of the wear of the refining surfaces 5, 8 of the stator 3 and the rotor 6 during the time interval SET-T. According to this embodiment the wear of the refining surfaces 5, 8 of the stator 3 and the rotor 6 can be compensated accurately and the size of the blade gap 12 may be maintained substantially constant at its set value SET-D. An embodiment of the method like that is disclosed schematically in FIG. 3.

The set value SET-FW for the compensation of the wear of the refining surfaces and the set value SET-T for the respective time interval may vary depending on the actual refining application. Typically, the set value SET-FW may vary between 0,001-0,01 mm and it may be based on an estimated or empirical value for the wear of the refining surfaces during the time interval SET-T. Depending on the implementation the set value SET-FW may refer to an intended movement of the rotor 6 in the axial direction A of the refiner 1 or to an intended change in the size D of the blade gap 12, the latter being then converted by the control unit 21 to a specific intended movement of the rotor 6 in the axial direction A of the refiner 1. The set value SET-T may be from a few minutes to tens of hours, for example. From time to time the control unit 21 may control the loading device 16 to move the rotor 6 towards the stator 3 as long as the rotor 6 touches the stator 3, and thereafter to control the loading device 16 to move the rotor 6 away from the stator 3 according a distance corresponding the set value SET-D set for the size of the blade gap 12, and thereby eliminate any possible deviation in the size of the blade gap 12 for example due to wear of the refining surfaces being different from the estimated wear of the refining surfaces.

According to an embodiment of the arrangement, the arrangement comprises a position measuring device for providing a position measurement signal describing a position of the at least one refining element in respect of the at least one another refining element, and that the at least one control unit is configurable to receive from the position measuring device the position measurement signal and to control the position of the at least one element in respect of the at least one another refining element based on the position measurement signal.

According to this embodiment, and referring to the embodiment of FIG. 1, the arrangement comprises a position measuring device 22 for providing a position measurement signal PMS describing a position of the rotor 6 relative to the stator 3. The control unit 21 is configured to receive the position measurement signal PMS from the position measuring device 22, and additionally to control, by the loading device 16, the position of the rotor 6 relative to the stator 3 based on the position measurement signal PMS. According to this embodiment the position of the rotor 6 in respect of the stator 3 may be determined and controlled accurately thanks to the position measurement signal PMS providing a feedback signal about the position of the rotor 6 relative to the stator 3.

According to an embodiment of the arrangement, the loading device comprises at least one servomotor comprising a position measuring device for measuring a rotational position of a shaft of the servomotor, and that the at least one control unit is configurable to receive from the position measuring device a position measurement signal describing the measured rotational position of the shaft of the servomotor, to determine the position of the at least one refining element in respect of the at least one another refining element based on the measured rotational position of the shaft of the servomotor and a coupling between the at least one refining element and the shaft of the servomotor, and additionally to control the position of the at least one refining element in respect of the at least one another refining element based on the position measurement signal.

According to this embodiment, and referring to the embodiment of FIG. 1, the loading device 16 comprises as an adjusting device a servomotor 23 comprising a position measuring device 22 for measuring a rotational position of a shaft 23' of the servomotor 23. The control unit 21 is configured to receive from the position measuring device 22 the position measurement signal PMS describing the measured rotational position of the shaft 23' of the servomotor 23 and to determine the position of the rotor 6 relative to the stator 2 based on the measured rotational position of the shaft 23' of the servomotor 23 and a mechanical coupling between the rotor 6 and the shaft 23' of the servomotor 23. Additionally, the control unit 21 is configured to control the position of the rotor 6 relative to the stator 3 based on the position measurement signal PMS. The servomotor 23 provided with the position measuring device 22 provides an equipment by which the adjustment of the position of the rotor 6 relative to the stator 3 can be implemented very accurately.

With the solution disclosed above, the size of the blade gap 12 may be adjusted very accurately with an arrangement comprising a very reasonable number of different devices.

The accurate adjustment of the size of the blade gap 12 is especially important in manufacturing of microfibrillar cellulose (MFC) or nanofibrillar cellulose (NFC). The term "nanofibrillar cellulose" refers herein to a collection of separate cellulose microfibrils or microfibril bundles derived from plant-based, and especially wood-based fibrous material. Synonyms for the nanofibrillar cellulose (NFC) are for example nanofibrillated cellulose, nanocellulose, microfibrillar cellulose, cellulose nanofiber, nano-scale cellulose, microfibrillated cellulose (MFC) or cellulose microfibcrils. Depending on the degree of grinding a particle size of the separate cellulose microfibrils or microfibril bundles is of some nanometres (nm) or micrometres (μm). A mean length of the separate cellulose microfibrils or microfibril bundles may for example be 0.2-200 μm and a mean diameter may for example be 2-1000 nm.

The arrangement disclosed herein for adjusting the size of the blade gap may additionally comprise a measuring sensor intended for measuring the gap between the opposite refining elements. The measuring sensor like that is typically arranged at one of the opposite refining elements and may for example be utilized in a calibration of the vibration-based adjustment of the size of the blade gap.

In the embodiment of FIG. 1, the refiner 1 is a conical refiner comprising a single stator and a single rotor, but the solution for adjusting the blade gap of the refiner as disclosed herein may as well be applied in conical refiners with any number of stators and/or rotors. The refining surfaces in the stator and/or rotor of the refiner may comprise openings as shown in FIG. 1, or the refining surfaces may be substantially uniform not comprising any openings. The supply of fibre material to be refined may also take place only at one end of the refiner, or at a side of the refiner if the fibre material to be refined is supplied into the refiner through openings in the stationary refining element. As it is evident from above, in the conical refiner, when adjusting the blade gap, the movement of the refining element takes place in the axial direction A of the refiner and the change in the size of the blade gap 12 takes place at some angle between the axial direction A and the radial direction R of the refiner, depending on an angle of ascent of the conical structure of the refining element.

Furthermore, instead of conical refiners, the solution disclosed herein may as well be implemented in a disc refiner comprising disc-like refining elements extending in a radial direction of the refiner, i.e. in the direction that is substantially perpendicular to the axial direction of the refiner. In the disc refiner, when adjusting the blade gap, the movement of the refining element as well as the change in the size of the blade gap 12 takes place in the axial direction A of the refiner. The refining element to be moved in the disc refiner may as well be either a stationary refining element or a rotatable refining element. The disc-like refiner may also have any number of stators and/or rotors. The basic structure and operating principle of the disc refiner is known for a person skilled in the art of refiners and therefore is not disclosed in more detail herein.

Furthermore, instead of conical refiners and disc refiners, the solution disclosed herein is also applicable in cylindrical refiners comprising a number of cylindrical stators and/or rotors. In cylindrical refiners the adjustment of the blade gap typically takes place adjusting the diameter of the stator, whereby the movement of the refining element as well as the change in the size of the blade gap takes place in the radial direction R of the refiner. In the cylindrical refiner the loading device may thus be arranged in an operative connection with the stator in order to cause the diameter of the stator to change in response to respective control signal applied to the loading device by the control unit, thereby moving the stator or the stator blade elements towards the rotor or the rotor blade elements. The basic structure and operating principle of the cylindrical refiner is also known for a person skilled in the art of refiners and therefore is not disclosed in more detail herein.

In the examples above, the refiners disclosed were intended especially for refining lignocellulose-containing fibre material. In addition to the refiners for refining lignocellulose-containing fibre material, the solution for adjusting the size of the blade gap as disclosed herein may as well be applied in refiners intended for refining other materials, such as minerals, natural and synthetic polymers, carbon, coal, metals or any mixtures or alloys thereof.

It will be obvious to a person skilled in the art that, as the technology advances, the inventive concept can be implemented in various ways. The invention and its embodiments are not limited to the examples described above but may vary within the scope of the claims.

The invention claimed is:

1. A method for adjusting a blade gap in a refiner, the method comprising the steps of:
measuring a vibration of the refiner in operation to obtain a vibration measurement signal (VMS) describing the vibration of the refiner in operation,
comparing the vibration measurement signal (VMS) describing the vibration of the refiner in operation with a condition (SET-V) settable for the vibration of the refiner, the condition (SET-V) indicating the refining elements have touched,
moving at least one refining element towards at least one another refining element until the compared vibration measurement signal (VMS) and the condition (SET-V) indicate the refining elements touch to each other,
then moving the at least one refining element away from the at least one another refining element in accordance with a settable distance (SET-BW),
then periodically in accordance with a settable time interval (SET-T) after the at least one refining element has been moved away from the at least one another refining element, repeating the above steps of measuring, comparing, moving at least one refining element towards at least one another refining element, and then moving the at least one refining element away from the at least one another refining element, to provide a consistent settable distance between the refining elements.

2. The method as claimed in claim 1, providing a position measurement signal (PMS) describing a position of the at least one refining element in respect of the at least one another refining element, and
controlling the position of the at least one refining element in respect of the at least one another refining element based on the position measurement signal (PMS).

* * * * *